(12) United States Patent
Kim (10) Patent No.: US 10,025,364 B2
(45) Date of Patent: Jul. 17, 2018

(54) GPU POWER MEASURING METHOD OF HETEROGENEOUS MULTI-CORE SYSTEM

(71) Applicant: ELECTRONICS AND TELECOMMUNICATIONS RESEARCH INSTITUTE, Daejeon (KR)

(72) Inventor: Young-Joo Kim, Daejeon (KR)

(73) Assignee: ELECTRONICS AND TELECOMMUNICATIONS RESEARCH INSTITUTE, Daejeon (KR)

(*) Notice: Subject to any disclaimer, the term of this patent is extended or adjusted under 35 U.S.C. 154(b) by 135 days.

(21) Appl. No.: 14/865,537

(22) Filed: Sep. 25, 2015

(65) Prior Publication Data

US 2016/0274636 A1 Sep. 22, 2016

(30) Foreign Application Priority Data

Mar. 16, 2015 (KR) .................. 10-2015-0036076

(51) Int. Cl.
*G06F 1/26* (2006.01)
*G06F 1/28* (2006.01)
(Continued)

(52) U.S. Cl.
CPC .............. *G06F 1/28* (2013.01); *G06F 1/26* (2013.01); *G06F 1/329* (2013.01); *G06F 9/50* (2013.01); *G06F 11/2273* (2013.01); *Y02D 10/24* (2018.01)

(58) Field of Classification Search
CPC ........ G06F 1/3202; G06F 1/3231; G06F 1/26; G06F 1/206; G06F 1/3228; G06F 1/08;
(Continued)

(56) References Cited

U.S. PATENT DOCUMENTS

2012/0086472 A1* 4/2012 Miller .................. H03K 19/177
326/39
2013/0145180 A1* 6/2013 Branover .................. G06F 1/00
713/300

(Continued)

FOREIGN PATENT DOCUMENTS

CN        104461849      * 12/2014 .............. G06F 11/34
KR    1020140020404 A     2/2014
KR    1020140067581 A     6/2014

OTHER PUBLICATIONS

TTA Technical Report; A Power Analysis Method for OpenCL-based Application Programs in Heterogeneous Embedded systems with Multi-cores (Technical Report) 23 pages TTAR-11.0029 Dec. 3, 2013.

*Primary Examiner* — Zahid Choudhury
(74) *Attorney, Agent, or Firm* — Ladas & Parry LLP (57) ABSTRACT

Provided is a method for measuring power of a graphics processing unit. The method includes changing a utilization of the graphics processing unit through an application programming interface (API), measuring and storing the utilization or a driving frequency of the graphics processing unit for each trace time, measuring and storing power consumption of the graphics processing unit for each trace time, and synchronizing the utilization of the graphics processing unit with the power consumption according to a stored trace time and calculating a power coefficient for each driving frequency with reference to synchronized information.

13 Claims, 8 Drawing Sheets

(51) Int. Cl.
*G06F 1/32* (2006.01)
*G06F 9/50* (2006.01)
*G06F 11/22* (2006.01)

(58) Field of Classification Search
CPC ....... G06F 1/3289; G06F 1/266; H04L 12/12; H04L 12/10
See application file for complete search history.

(56) References Cited

U.S. PATENT DOCUMENTS

| | | | |
|---|---|---|---|
| 2013/0151869 A1* | 6/2013 | Steinman | G06F 1/324 713/300 |
| 2013/0328890 A1* | 12/2013 | Avkarogullari | G06F 1/206 345/501 |
| 2014/0146060 A1 | 5/2014 | Chung et al. | |
| 2014/0372810 A1 | 12/2014 | Na | |
| 2014/0373025 A1 | 12/2014 | Kim | |
| 2015/0220672 A1 | 8/2015 | Park | |
| 2016/0170465 A1* | 6/2016 | Flynn | G06F 1/3203 713/320 |

\* cited by examiner

(i) gpu_freq_1

(ii) gpu_freq_2

(iii) gpu_freq_n

FIG. 8

GPU POWER MEASURING METHOD OF HETEROGENEOUS MULTI-CORE SYSTEM

CROSS-REFERENCE TO RELATED APPLICATIONS

This U.S. non-provisional patent application claims priority under 35 U.S.C. § 119 of Korean Patent Application No. 10-2015-0036076, filed on Mar. 16, 2015, the entire contents of which are hereby incorporated by reference.

BACKGROUND

The present disclosure herein relates to a multi-core system, and more particularly, to a method for measuring power of an embedded system including a graphics processing unit (GPU).

As smart devices are more advanced and widely used, users' needs also increase. Therefore, compared to smart devices developed in the past to execute simple application programs, recently developed high performance and multi-functional smart devices enable 3D game playing, TV viewing, video playback, use of web browsers, social activities, or the like. However, most of such devices are battery-powered embedded systems limited in power. Recently, embedded devices equipped with a heterogeneous multi-core based on a central processing unit (CPU) and a graphics processing unit (GPU) have been developed to satisfy the requirements of high performance and low power consumption.

Embedded software for a heterogeneous multi-core, such as application programs for high performance and low power consumption, may be developed using open computing language (OpenCL) or OpenGL for embedded systems (ES) that is a programming interface. For example, when a 3D game for a smart device is driven, a GPU may be used together with a CPU to distribute calculation loads of the CPU and use a high-speed parallel processing function. Therefore, as a technology of general-purpose computing on graphics processing units (GPGPU) is used in a heterogeneous multi-core environment, a calculation speed may be accelerated through parallel processing while reducing a load on a CPU.

Overall power consumption and CPU power consumption of such devices may be measured or estimated using hardware measuring equipment or a power-modeling-based software tool. However, it is not easy to measure GPU power consumption due to several limitations. For example, there is no equipment for measuring a GPU alone, and a GPU is not used individually. To overcome such limitations, a power sensor may be installed in a GPU so that GPU power consumption may be measured. The GPU power consumption may be measured in real time by virtue of the built-in power sensor. However, since the power sensor itself should be registered by a device driver, the device driver should be repetitively accessed whenever power measurement is performed. Therefore, considerable system overhead may be caused, and analysis on overall power consumption is difficult since only the GPU power consumption is measured.

SUMMARY

The present disclosure provides a power modeling method for a GPU of a heterogeneous multi-core system and a method for estimating power using a power coefficient calculated through power modeling.

An embodiment of the inventive concept provides a method for measuring power of a graphics processing unit, the method including changing a utilization of the graphics processing unit through an application programming interface (API), measuring and storing the utilization or a driving frequency of the graphics processing unit for each trace time, measuring and storing power consumption of the graphics processing unit for each trace time, and synchronizing the utilization of the graphics processing unit with the power consumption according to a stored trace time and calculating a power coefficient for each driving frequency with reference to synchronized information.

BRIEF DESCRIPTION OF THE FIGURES

The accompanying drawings are included to provide a further understanding of the inventive concept, and are incorporated in and constitute a part of this specification. The drawings illustrate exemplary embodiments of the inventive concept and, together with the description, serve to explain principles of the inventive concept. In the drawings.

DETAILED DESCRIPTION

Exemplary embodiments of the inventive concept will be described in detail with reference to the accompanying drawings so that those skilled in the art easily implement the inventive concept. The same reference numerals refer to the same elements. Likewise, like reference numerals refer to like elements. The operations performed by the mobile device or the processor described below are merely examples, and thus may be variously modified without departing from the scope of the inventive concept.

The inventive concept may be implemented or applied by other embodiments. Furthermore, the detailed description may be amended or modified according to an aspect or application without departing from other objects or the scope of the inventive concept. The embodiments of the inventive concept are described below in detail with reference to the accompanying drawings.

Recently, various forms of adaptation may be used for Internet and Web-based applications and services. Adaptation generally refers to a process in which a system changes its behavior based on information. From an Internet/Web perspective, current forms of application and service adaptation are generally limited to self-adaptation in which an application or service performs adaptation on itself based on local policies or intelligence. Existing network-based forms of adaptation involve the use of adaptation network proxies, gateways, or services that are specifically built and customized to perform adaptation for a particular type(s) of application/service.

It has been recognized that a future IoT (Internet of Things) may include IoT-type devices that have migrated towards a service oriented architecture and IoT-type devices that offer their capabilities via services. Further, IoT networks may migrate toward a service oriented architecture that hosts network-based services upon network nodes such as cloud servers, gateways, and routers to assist and enable IoT devices and applications to interact with one another in an intelligent and efficient manner. Thus, IoT devices and applications that interact with each other in such a manner can also be referred to as a Web of Things (WoT).

In case of WoT service architecture, WoT service support functions are provided for discovering and providing WoT service. And it is also responsible for containing and updating the WoT service information.

The WoT service support functions may manage overall behaviors of the WoT service. The WoT service support functions may provide service profile management, service discovery, service monitoring, QoS management, and access control and policy management of WoT service. The WoT service support functions may include a plurality of functional entities. One of the plurality of functional entities is WoT service monitoring functional entity. The WoT service monitoring functional entity may perform monitoring of the registered WoT service. The Web client or other functional entity may utilize the WoT service monitoring functional entity to find out the status of WoT service. The status of WoT service is recommended to include service availability or predicted response time, static/dynamic status information and resource information, e.g. CPU/GPU power.

Figure 1:
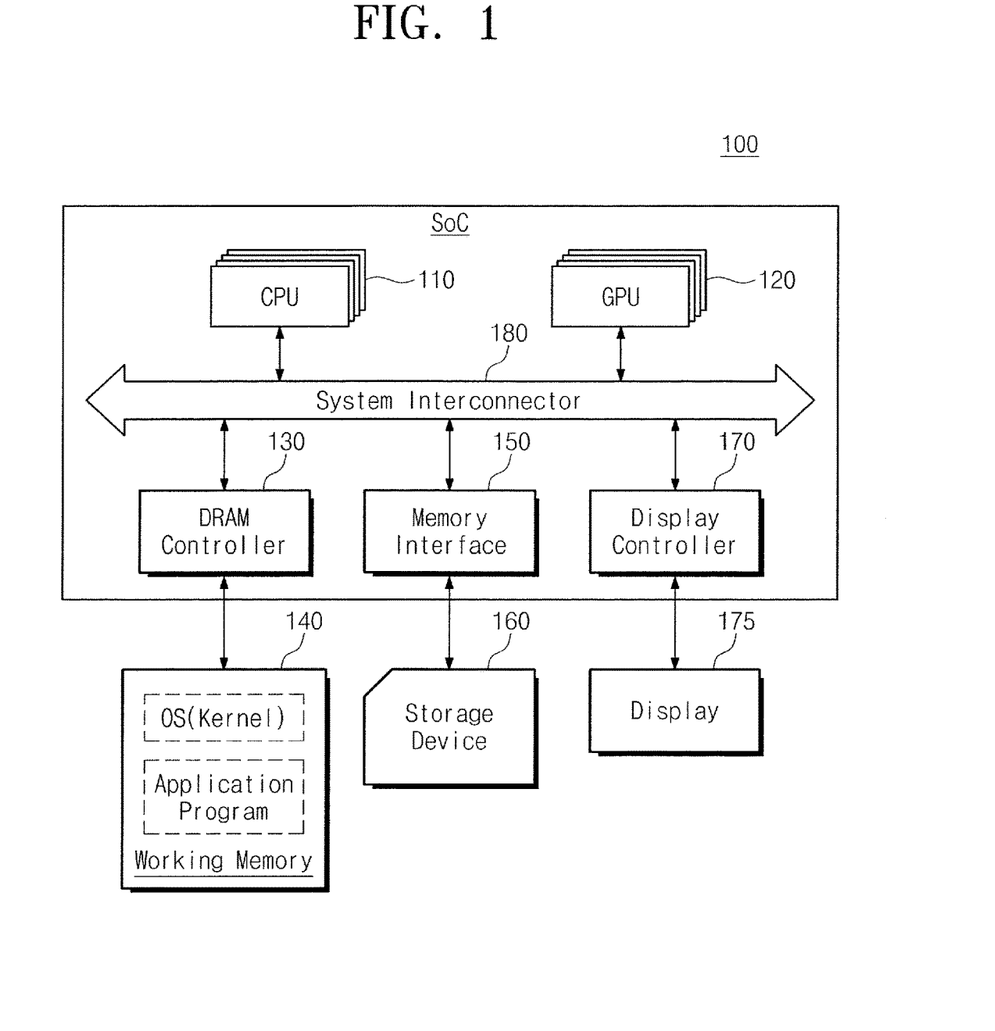
FIG. 1 is a schematic block diagram illustrating an embedded system according to an embodiment of the inventive concept.

The WoT service monitoring functional entity is required to monitor system resource information of processor power consumption, e.g. CPU and GPU, in order to predict system power consumption of WoT service. For, the system resource is necessary to provide real-time quality of WoT service such as high performance and low power. And, GPU resource is measured by using power coefficient corresponding to each GPU frequency, GPU utilization and GPU static power. FIG. 1 is a schematic block diagram illustrating an embedded system according to an embodiment of the inventive concept. Referring to FIG. 1, an embedded system 100 may include a system on chip (SoC), a working memory 140, a storage device 160, and a display 175. The SoC includes a central processing unit (CPU) 110, a graphics processing unit (GPU) 120, a DRAM controller 130, a memory interface 150, a display controller 170, and a system interconnector 180. It will be understood that the elements of the embedded system 100 are not limited to the illustrated elements. For example, the embedded system 100 may further include a security block or a hardware codec for processing image data.

The CPU 110 executes software (an application program, an operating system, or device drivers) to be run on the embedded system 100. The CPU 110 executes an operating system (OS) loaded on the working memory 140. The CPU 110 executes various application programs to be run on the OS. The CPU 110 may be provided as a homogeneous multi-core processor or a heterogeneous multi-core processor. The multi-core processor is a computing component having at least two processors (hereinafter referred to as cores) that are able to be driven individually. Each core may individually read and execute programs instructions.

The GPU 120 performs various graphic operations according to a request of the CPU 110. That is, the GPU 120 may convert data requested to be processed into data suitable for the display 175. The GPU 120 has an operational structure suitable for parallel processing for repetitively performing similar operations. Recently developed GPUs have a structure suitable for various operations that require not only graphic operations but also high-speed parallel processing. For example, a GPU that performs general tasks other than graphics processing tasks is referred to as a general purpose computing on graphics processing unit (GPGPU). The GPGPU may be used for not only video encoding but also molecular structure analysis, decryption, weather prediction, or the like. However, since most application programs are run on the basis of the CPU 110, a programming interface, i.e., OpenCL or OpenGL ES, may be used in order to use the GPU 120.

The DRAM controller 130 provides an interface between the working memory 140 and the SoC. The DRAM controller 130 accesses the working memory 140 according to a request of the CPU 110 or another intellectual property (IP). For example, the DRAM controller 130 may write data into the working memory 140 according to a write request of the CPU 110. Furthermore, the DRAM controller 130 may read data from the working memory 140 according to a read request of the CPU 110, and may transfer the data to the CPU 110 or the memory interface 150 via the system interconnector 180.

When a booting operation is performed, an OS or default application programs are loaded on the working memory 140. For example, when the embedded system 100 is booted, an OS image stored in the storage device 160 is loaded on the working memory 140 on the basis of a booting sequence. Various input/output operations of the embedded system 100 may be supported by the OS. Likewise, application programs for providing basic services or selected by a user may be loaded on the working memory 140. Furthermore, the working memory 140 may be used as a buffer memory for storing image data provided from an image sensor such as a camera. The working memory 140 may be a volatile memory such as a static random access memory (SRAM) or a dynamic random access memory (DRAM) or a nonvolatile memory such as a PRAM, an MRAM, a ReRAM, an FRAM, a NOR flash memory, or the like.

Application programs of the embodiments of the inventive concept include a first application program APP_1 for controlling utilization of the GPU 120 to perform power modeling of the GPU 120. That is, for the first application program APP_1, OpenGL or OpenCL is used as an application programming interface (API) of the GPU 120. When the first application program APP_1 is run, a second application program APP_2 for reading and recording the utilization of an actually operating GPU from a GPU driver is additionally required. This program allows the user to read the utilization of a GPU through an interface implemented by a kernel module program so that a GPU utilization, a GPU frequency, a run time, or the like may be extracted. Furthermore, a third application program APP_3 for recording GPU power consumed due to operation of a program coded using OpenGL or OpenCL is required. In addition, the application programs of the embodiments of the inventive concept may further include an application program for extracting a power coefficient using data measured by the first to third application programs or an application program for calculating power consumption of the GPU 120 in a software level using the extracted power coefficient.

The memory interface 150 accesses the storage device 160 according to a request of the CPU 110. That is, the memory interface 150 provides an interface between the SoC and the storage device 160. For example, data processed by the CPU 110 is stored in the storage device 160 via the memory interface 150. For another example, data stored in the storage device 160 may be provided to the CPU 110 via the memory interface 150.

The storage device 160 is provided as a storage medium of the embedded system 100. The storage device 160 may store application programs, an OS image, and various data. The storage device 160 may be provided as a memory card (e.g., an MMC, an eMMC, an SD, a MicroSD, or the like). The storage device 160 may include a NAND-type flash memory having a large storage capacity. Alternatively, the storage device 160 may include a NOR flash memory or a next-generation nonvolatile memory such as a PRAM, an MRAM, a ReRAM, or an FRAM. In another embodiment of the inventive concept, the storage device 160 may be an internal memory provided in the SoC.

The display controller 170 displays, on the display 175, image data processed in the GPU 120. The display controller 170 may further include a plurality of direct memory access (DMA) modules, an image processing circuit, a timing controller, or an transmitting interface.

The system interconnector 180 is a system bus for providing an on-chip network in the SoC. The system interconnector 190 includes, for example, a data bus, an address bus, and a control bus. The data bus is a path through which data passes. The data bus may mainly provide a memory access path to the storage device 160. The address bus provides an address exchange path between IPs. The control bus provides a path for transferring control signals between IPs. However, the system interconnector 190 is not limited to the above description, and may further include intermediary units for efficient management.

As described above, the embedded system 100 according to an embodiment of the inventive concept may model and measure power of the GPU 120 using application programs with OpenGL or OpenCL as an API. Furthermore, the embedded system 100 may run an application program or a module for calculating a power coefficient of the GPU 120 with reference to data extracted through power modeling, or application programs for calculating power of the GPU 120 in real time using an estimated power coefficient. By virtue of such functions, the embedded system 100 according to an embodiment of the inventive concept may enable task allocation optimized for respective driving environments of multiple cores which vary in real time. In addition, the embedded system 100 may be at least one of a terminal, device, and node for supplying WoT service.

Figure 2:
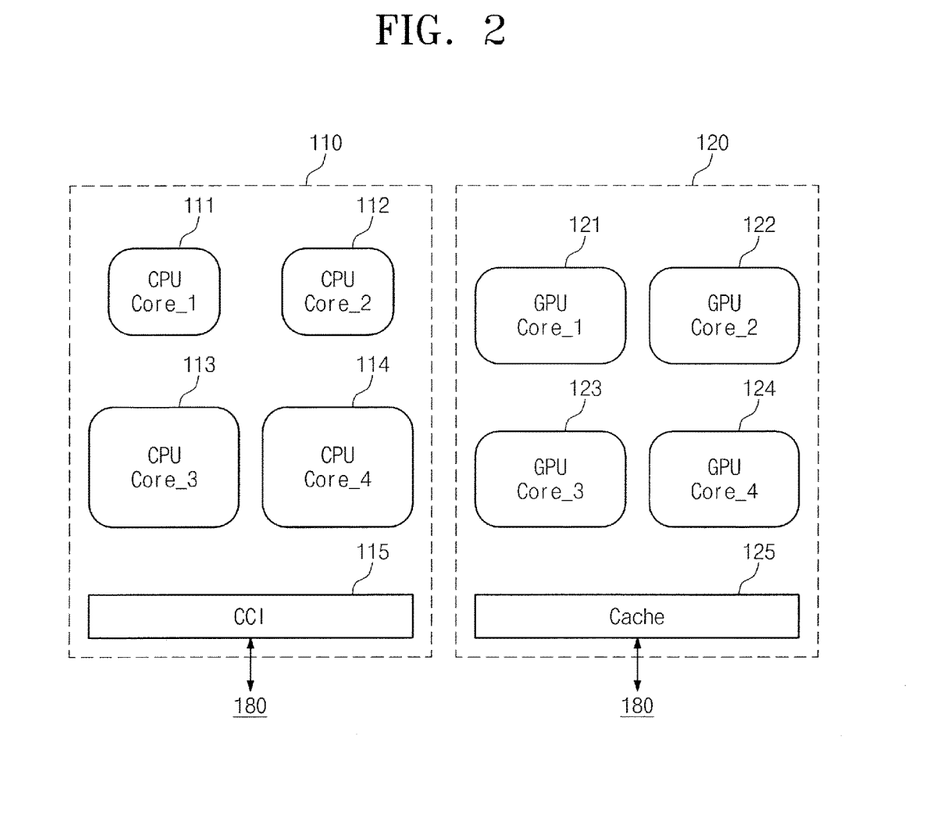
FIG. 2 is a diagram exemplarily illustrating structures of the heterogeneous multiple cores of FIG. 1.

FIG. 2 is a block diagram exemplarily illustrating structures of the CPU 110 and the GPU 120 of FIG. 1. Referring to FIG. 2, the CPU 110 and the GPU 120 may be implemented as a heterogeneous multi-core processor.

The CPU 110 may include a plurality of cores 111 to 114. The plurality of cores 111 to 114 may be driven by different power supply voltages, or may be driven by different operational clocks. For example, the cores 111 to 114 may be homogenous cores or heterogeneous cores. In the case where the CPU 110 is controlled using a dynamic voltage frequency scaling (DVFS) technique, changes in a driving voltage and a clock frequency may be commonly applied to all the cores 111 to 114. On the contrary, in the case where the CPU 110 is driven using a big.LITTLE technique, the cores may be driven by different frequencies or voltages on the basis of cluster units (e.g., 111-112 and 113-114).

A cache coherent interconnector (CCI) 115 supports migration between clusters. That is, in the case where a first cluster (111, 112) is enabled and a second cluster (113, 114) is disabled, cache data of the first cluster may be moved to a cache of the second cluster. The CCI 115 may be provided as a structure for ensuring data consistency between clusters.

The GPU 120 may include a plurality of cores 121 to 124. The cores 121 to 124 may be homogenous cores or heterogeneous cores. The GPU 120 may include a cache memory 125 for parallel processing of the cores 121 to 124 and for data exchange with the working memory 140 or the CPU 110.

The CPU 110 and the GPU 120 configured with a heterogeneous multi-core processor have been described exemplarily. However, the CPU 110 and the GPU 120 are not limited to the configuration illustrated in FIG. 2. The CPU 110 and the GPU 120 may be configured with a heterogeneous multi-core processor according to various combinations. In addition, power sensors may be included in the CPU 110 and the GPU 120, or an external power measuring device may be connected to the CPU 110 and the GPU 120 so as to measure power of the CPU 110 and the GPU 120.

Figure 3:
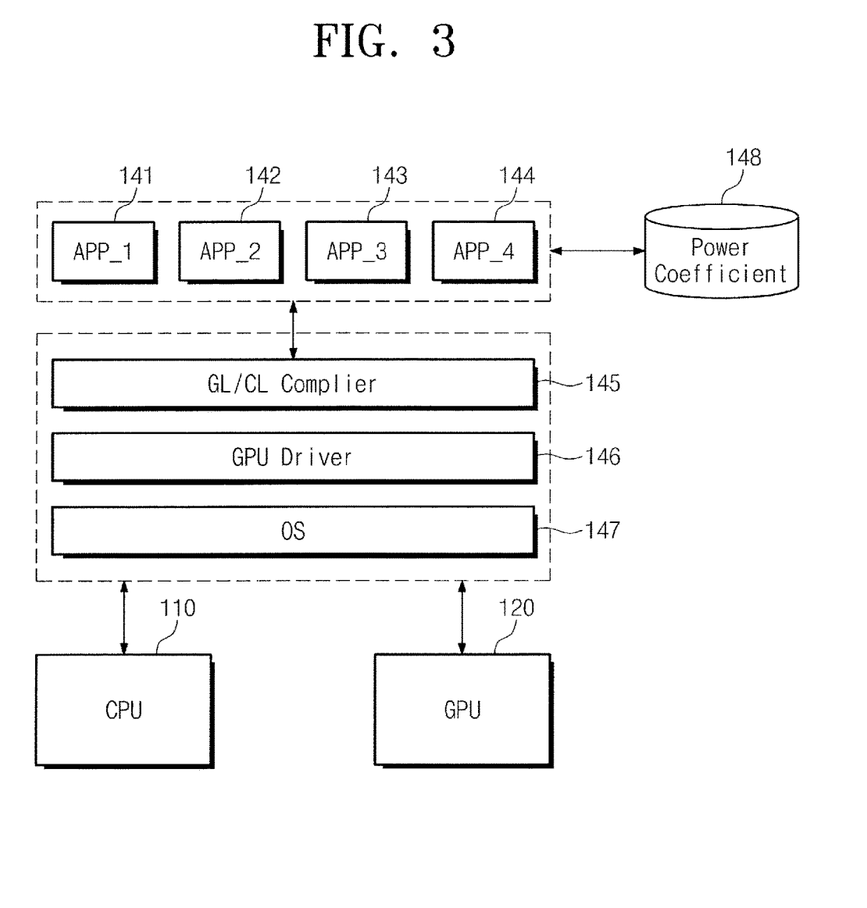
FIG. 3 is a block diagram illustrating a software structure of the mobile device of FIG. 1.

FIG. 3 is a block diagram illustrating a software structure of the embedded system 100 of FIG. 1. Referring to FIG. 3, a layer structure of software of the embedded system 100 loaded on the working memory 140 includes application programs 141 to 144, a complier 145, a GPU driver 146, and an OS 147.

The application programs 141 to 144 may include a plurality of application programs 141 to 143 for modeling power of the GPU 120 and an application program 144 for calculating a power coefficient using a result of the modeling power of the GPU 120. The application programs 141 to 144 may further include an application program for measuring power of the GPU 120 in real time using the calculated power coefficient.

The first application program 141 gradually increases the utilization of the GPU 120 in order to perform power modeling. For example, the first application program 141 may control the utilization using an API that uses the GPU 120 periodically. For example, the number of data queues (dataset) to be processed and an idle time time_sleep may be set so that the first application program 141 may gradually increase or decrease the utilization of the GPU 120. The control of the utilization of the GPU 120 by the first application program 141 may be implemented by OpenGL or OpenCL using an API. However, it is difficult to implement the control of the utilization of the GPU 120 by the first application program 141 by using OpenMP not using an API.

The second application programs 142 read a trace time trace_time, a driving frequency gpu_freq, and the utilization gpu_util of the GPU 120 controlled by the first application program 141, and record the read data in a memory. The second application programs 142 use an interface implemented by a kernel module program so that the trace time trace_time, the driving frequency gpu_freq, and the utilization gpu_util of the GPU 120 may be extracted from the GPU driver 146. The third application program 143 reads and records a GPU power gpu_pwr consumed due to operation of the first application program 141 coded using OpenGL or OpenCL.

Figure 4:
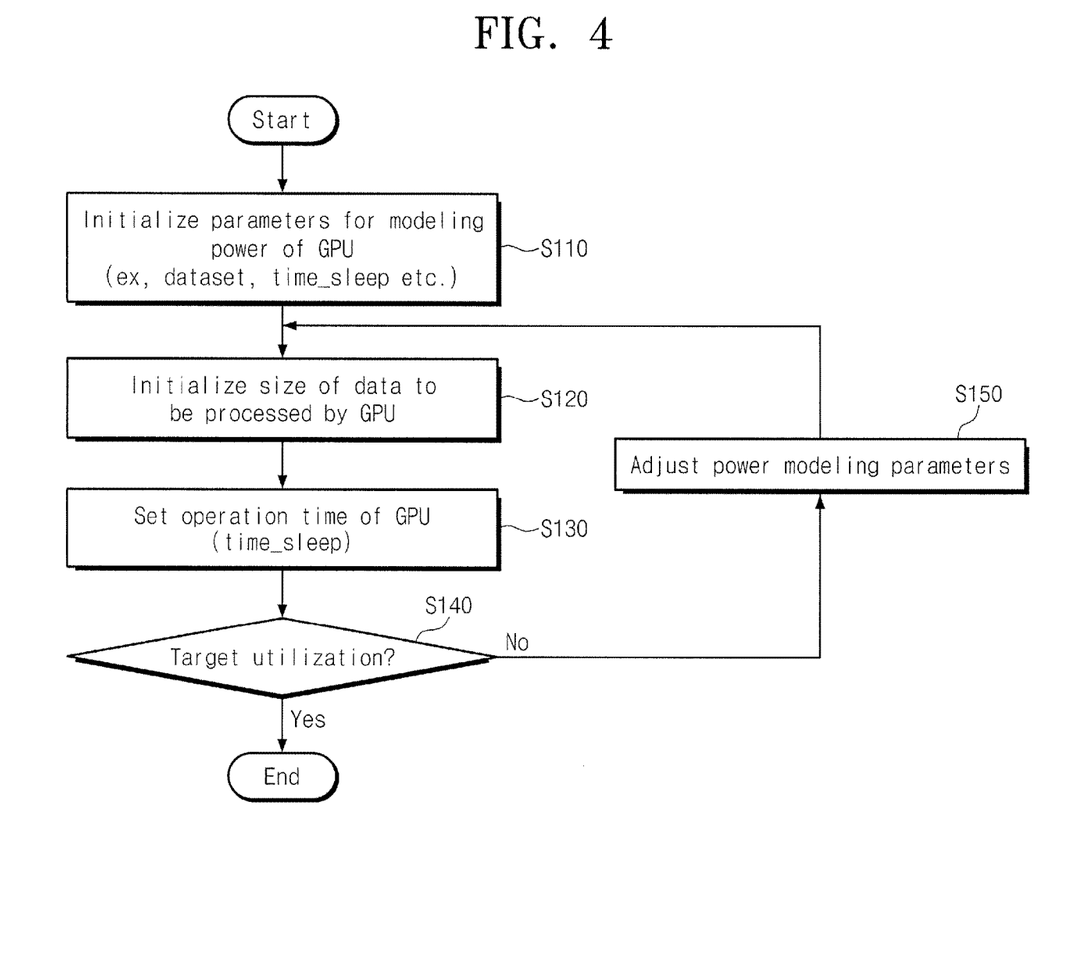
FIG. 4 is a flowchart illustrating an operating method for power modeling according to an embodiment of the inventive concept.

The application program 141 may be given a right to modify the GPU driver 146 so that GPU power modeling may be performed. This is because it may be required to read GPU information through the second application program 142 by creating an interface with a kernel module program capable of reading the GPU information by adding a specific code to a part of the CPU driver 146. Furthermore, the complier 145 that supports OpenGL and OpenCL for using the GPU 120 may be necessarily provided. In addition, a Linux OS such as Ubuntu may be used as the OS 147. FIG. 4 is a flowchart illustrating operation of the first application program APP_1 for performing power modeling. Referring to FIG. 4, the utilization of the GPU 120 (see FIG. 3) may be controlled as the first application program APP_1 is run.

In operation S110, parameters for modeling power of the GPU 120 are initialized by the first application program APP_1 that uses an API. For example, a size of data (dataset) provided from the CPU 110 or a sleep period length sleep_period of the GPU 120 may be initialized.

In operation S120, the size of data (dataset) to be processed by the GPU 120 is set by the first application program APP_1. For example, driving conditions of the GPU 120 are set with the initialized data size (dataset).

In operation S130, a sleep time of the GPU 120 is set by the first application program APP_1. The set sleep time sleep_period is applied to the driving conditions of the GPU 120.

In operation S140, it is determined whether the utilization of the GPU 120 reaches a target level. In the case where the utilization of the GPU 120 is set to be decreased up to 0%, a target utilization may be 0%. In this case, the process is ended. However, if the utilization of the GPU 120 does not reach the target utilization, the process proceeds to operation S150.

In operation S150, the first application program APP_1 increases or decreases the data size (dataset) or the sleep period length sleep_period of the GPU 120. Thereafter, the process returns to operation S120.

Figure 5:
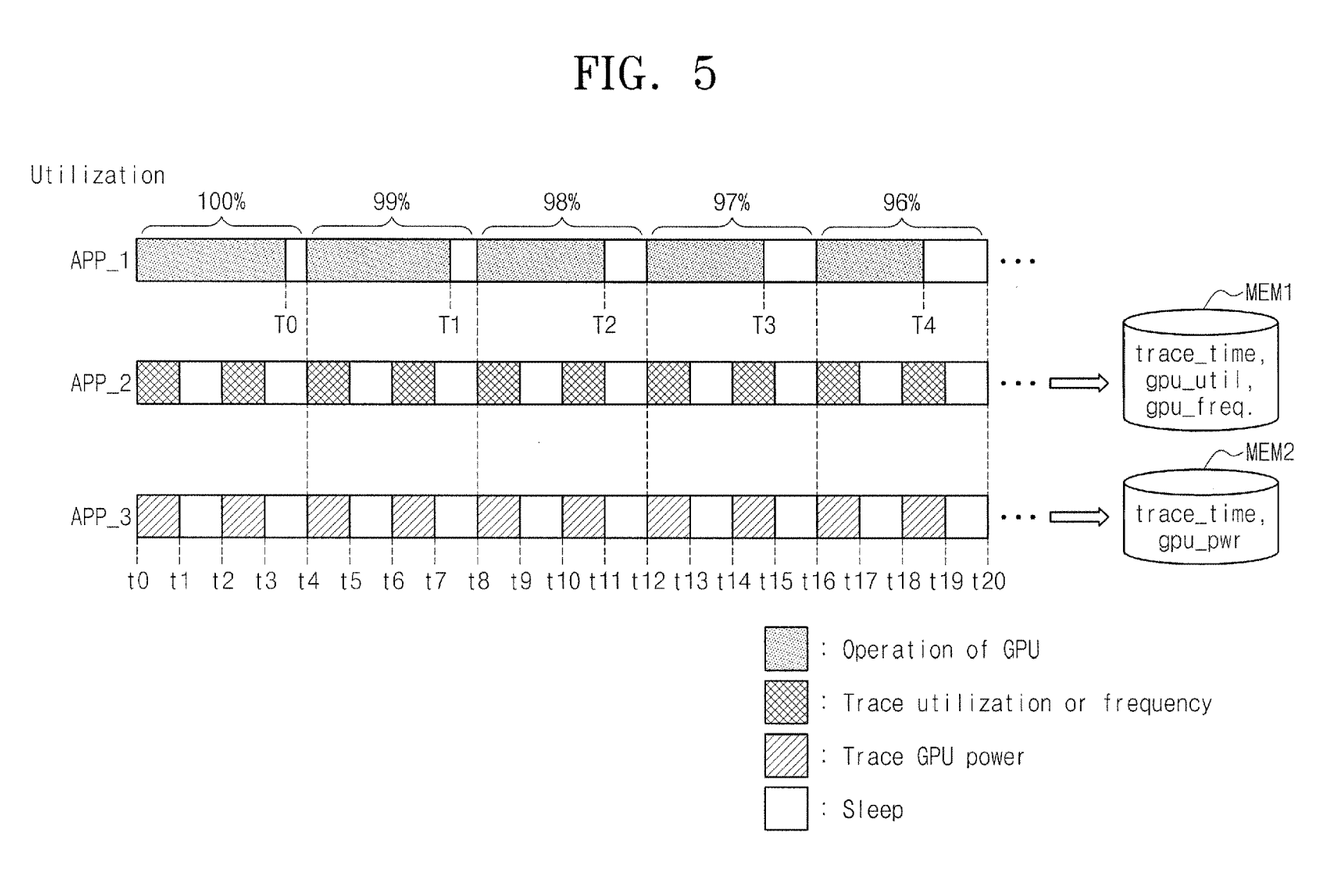
FIG. 5 is a flowchart illustrating a method for operating applications for modeling power of a GPU according to an embodiment of the inventive concept.

FIG. 5 is a schematic timing diagram illustrating operation of the application programs APP_1 to APP_3 of the embodiments of the inventive concept. Referring to FIG. 5, in order to model power of the GPU 120, the first application program APP_1 controls the utilization gpu_util of the GPU 120, and the application programs APP_2 and APP_3 monitor and store, in a memory, the trace time trace_time, the power gpu_pwr, the utilization gpu_util, and the frequency gpu_freq. This will be described in detail below.

When the application programs APP_1 to APP_3 are activated to model power of the GPU 120, the utilization of the GPU 120 is controlled by the first application program APP_1. For example, the utilization of the GPU 120 may be increased or decreased as time passes by the first application program APP_1. In FIG. 5, it is assumed that the utilization of the GPU 120 has an initial value of 100% and is controlled to be gradually decreased. That is, it is assumed that the size of data (dataset) transferred to the GPU 120 is gradually decreased, and a period of time during which the GPU 120 is maintained in a sleep state, i.e., the sleep period length, is increased by virtue of the control by the first application program APP_1 described above with reference to FIG. 4. Then, according to the above-mentioned setting, the first application program APP_1 starts to control the utilization of the GPU 120 through an API.

Firstly, the first application program APP_1 sets the data size (dataset) and the sleep period length sleep_period so that the GPU 120 is operated with the utilization of about 100% in an interval of t0-t4. Thereafter, the data size (dataset) and the sleep period length sleep_period are set so that the GPU 120 is operated with the utilization of about 99% in an interval of t4-t8. The utilization of the GPU 120 may be gradually decreased by the first application program APP_1. Here, although it has been described that the utilization of the GPU 120 is decreased by about 1%, it would be understood that a decrease amount of the utilization of the GPU 120 may be variously modified according to a setting of the user.

At the time when the utilization of the GPU 120 is changed by the first application program APP_1, the second application program APP_2 detects the frequency gpu_freq and the utilization gpu_util of the GPU 120 for each trace time trace_time and stores the detected parameters in a memory area MEM1. That is, the second application program APP_2 periodically detects the frequency gpu_freq and the utilization gpu_util of the GPU 120 and stores them with time information. In particular, in order to calculate a power coefficient for each frequency, it may be required to store the frequency gpu_freq and the utilization gpu_util of the GPU 120 for each trace time trace_time. The trace time trace_time may be necessary for the purpose of synchronization with a time of detection by the third application program APP_3.

At the time when the utilization of the GPU 120 is changed, the third application program APP_3 detects the power gpu_pwr consumed by the GPU 120 for each trace time trace_time and stores it in a memory area MEM2. The second and third application programs APP_2 and APP_3 may store the consumed power gpupwr and the utilization gpu_util of the GPU 120 in units of nano seconds. Thereafter, log files stored in the memory areas MEM1 and MEM2 by the second and third application programs APP_2 and APP_3 are synchronized so that a power coefficient is calculated. Here, the memory areas MEM1 and MEM2 may be specific areas of the working memory. Alternatively, the memory areas MEM1 and MEM2 may be memory areas assigned to the storage device 160 including a nonvolatile storage medium.

Figure 6:
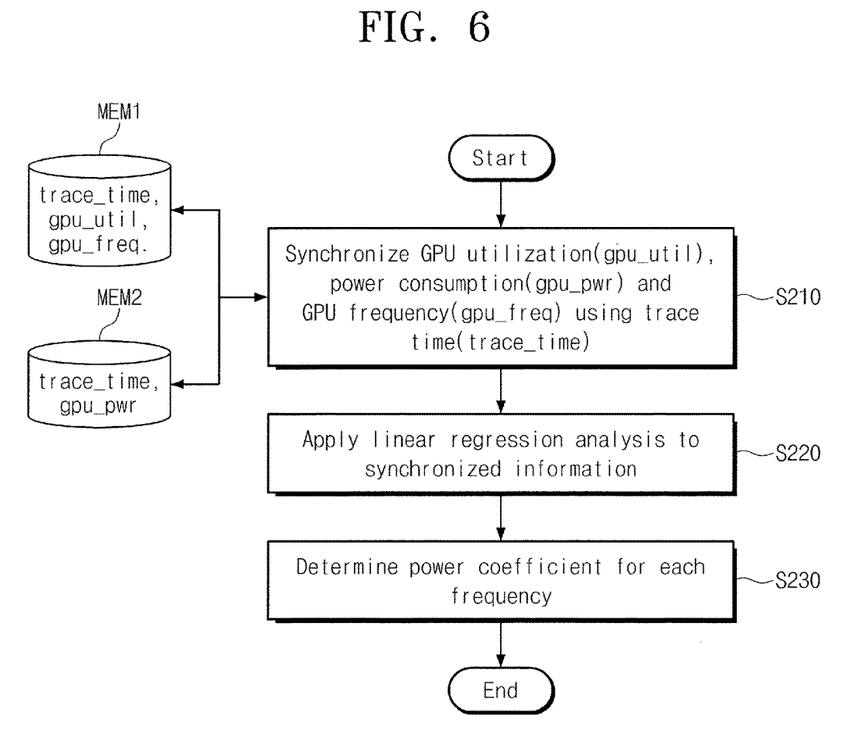
FIG. 6 is a flowchart illustrating a method for calculating a power coefficient of a GPU according to an embodiment of the inventive concept.

FIG. 6 is a schematic flowchart illustrating a method for calculating a power coefficient according to an embodiment of the inventive concept. Referring to FIG. 6, the pieces of information gpu_util, gpu_freq, and gpu_pwr detected and stored by the second and third application programs APP_2 and APP_3 may be synchronized and may be calculated as power coefficients for each frequency through linear regression analysis. An algorithm for performing such an operation may be performed by a specific software algorithm or an application program (e.g., APP_4). Here, it is assumed that a fourth application program APP_4 is exemplarily used to generate a power coefficient.

In operation S210, the fourth application program APP_4 reads the pieces of information trace_time, gpu_util, gpu_freq, and gpu_pwr stored in the memory areas MEM1 and MEM2. In particular, the fourth application program APP_4 synchronizes the information stored by the second application program APP_2, i.e., gpu_util and gpu_freq, with the information stored by the third application program APP_3, i.e., gpu_pwr. If the utilization gpu_util of the GPU 120 is not synchronized with the consumed power gpu_pwr, the accuracy of a calculated power coefficient may be deteriorated. The fourth application program APP_4 may synchronize the information stored by the second application program APP_2 with the information stored by the third application program APP_3 with reference to the trace time trace_time stored together with each piece of the information.

In operation S220, the fourth application program APP_4 applies the linear regression analysis to the synchronized pieces of information gpu_util, gpu_freq, and gpupwr. For example, the fourth application program APP_4 may model a functional relation between power consumption Y and utilization X of the GPU 120 driven in a first frequency band F1, using the linear regression analysis. Furthermore, the fourth application program APP_4 may model the functional relation between the power consumption Y and the utilization X of the GPU 120 driven in a second frequency band F2, using the linear regression analysis. In this manner, the fourth application program APP_4 applies the linear regression analysis in order to analyze the functional relation between the power consumption Y and the utilization X of the GPU 120 for each frequency.

In operation S230, the fourth application program APP_4 determines the functional relation between the power consumption Y and the utilization X modeled for each frequency by the linear regression analysis. For example, the fourth application program APP_4 determines a power coefficient with reference to the functional relation between the power consumption Y and the utilization X of the GPU 120 for each frequency. For example, the fourth application program APP_4 may determine, as the power coefficient, gradient information of the functional relation between the power consumption Y and the utilization X of the GPU 120 in each frequency band.

Described above is a method for calculating a power coefficient with reference to information obtained by analyzing pieces of synchronized information through the linear regression analysis.

Figure 7:
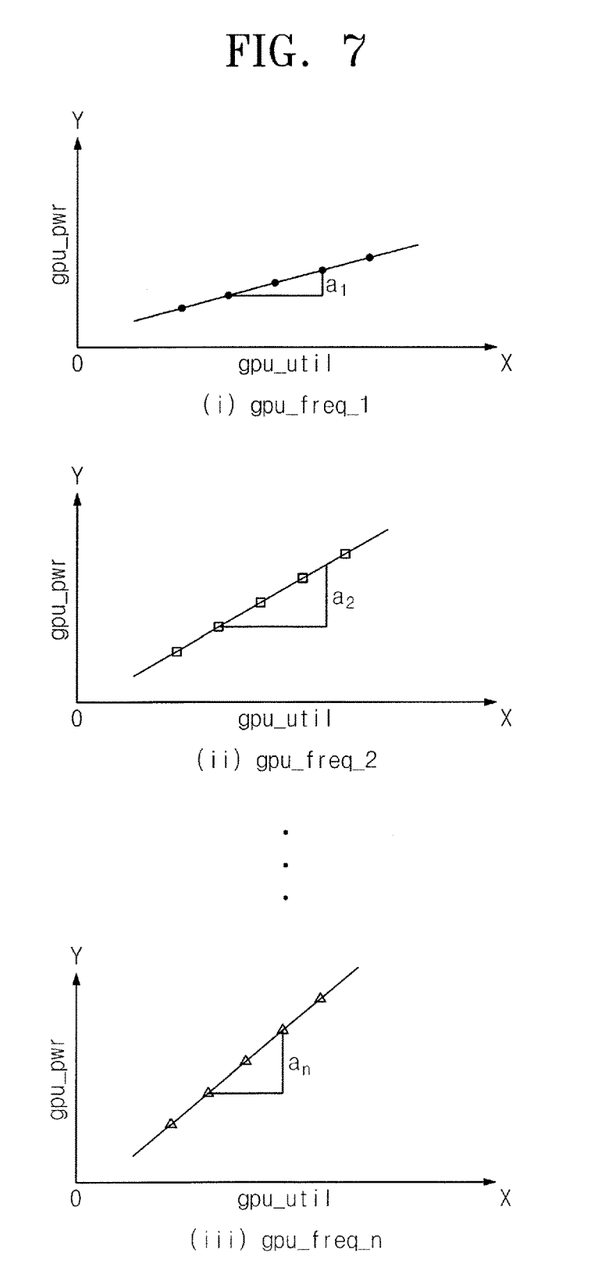
FIG. 7 shows graphs illustrating a method for determining a power coefficient through linear regression analysis.

FIG. 7 shows graphs illustrating a method for applying the linear regression analysis. Referring to FIG. 7, the amounts of the power consumption Y relative to the utilization X may be modeled as linear functions at frequencies gpu_freq_1 to gpu_freq_n at which the GPU 120 is driven.

Referring to graph (i) in which the amount of the power consumption Y relative to the utilization X is modeled at a first frequency gpu_freq_1, the power consumption Y may be modeled as a linear function having a gradient of $a_1$ with respect to the utilization X. Referring to graph (ii) in which the amount of the power consumption Y relative to the utilization X is modeled at a second frequency gpu_freq_2, the power consumption Y may be modeled as a linear function having a gradient of $a_2$ with respect to the utilization X. Referring to graph (iii) in which the amount of the power consumption Y relative to the utilization X is modeled at an nth frequency gpu_freq_n, the power consumption Y may be modeled as a linear function having a gradient of $a_n$ with respect to the utilization X.

The gradients $a_1$ to $a_n$ calculated for each frequency may be determined as power coefficients of the GPU 120 for each frequency.

Figure 8:
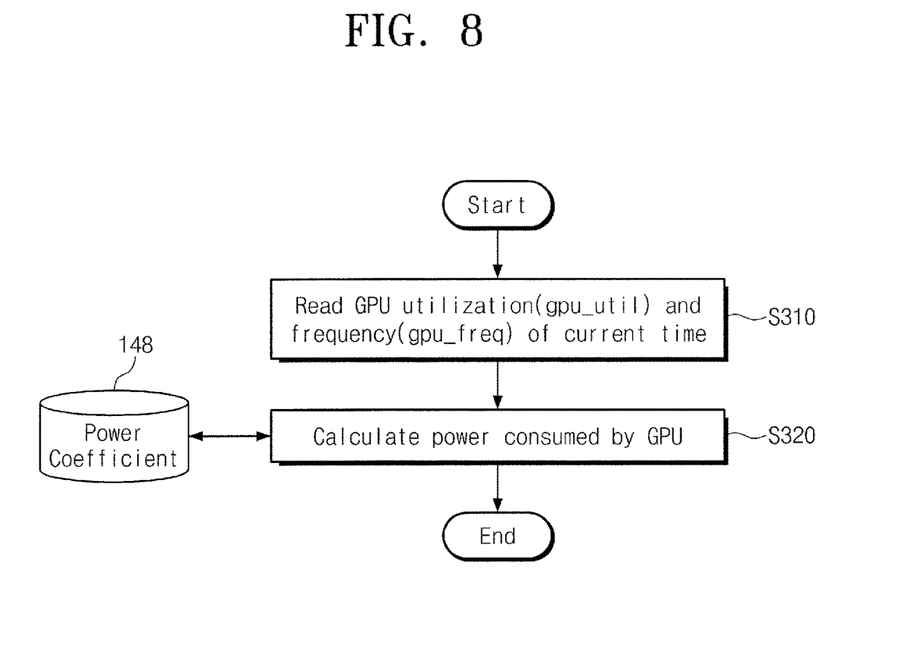
FIG. 8 is a flowchart illustrating a method for measuring GPU power according to an embodiment of the inventive concept.

FIG. 8 is a diagram illustrating a method for calculating power of the GPU 120 in real time using the above-mentioned power coefficients. Referring to FIG. 8, if the frequency and the utilization of the GPU 120 are detected in real time, power consumption at a current time may be easily calculated using previously calculated power coefficients.

In operation S310, the utilization gpu_util and the frequency gpu_freq may be obtained from a unit for detecting the frequency and the utilization of the GPU 120. Here, the unit for obtaining the frequency and the utilization of the GPU 120 may be provided as hardware such as a GPU monitor. Alternatively, regarding programs based on OpenCL or OpenGL which use the GPU 120, a part of program codes which uses the GPU 120 may be detected from the program codes by a program monitor so that the utilization at the moment of executing the part may be obtained.

In operation S320, a power coefficient calculated in advance by a unit (e.g., a power estimator) for performing a power estimating operation is read so that power consumption at a corresponding frequency is calculated. For example, power $P_{gpu}$ consumed by the GPU 120 may be expressed as Equation (1) as below.

$$P_{gpu} = AiX + P_0 \quad (1)$$

where Ai denotes a power coefficient at a corresponding frequency, and $P_0$ denotes a value of power consumed constantly.

According to the method for modeling and measuring power consumed by a GPU of a heterogeneous multi-core system according to an embodiment of the inventive concept, power of the GPU consumed by a program or a system may be measured in real time using a power coefficient of the GPU calculated for each frequency. Furthermore, since system devices are not controlled when the power of the GPU is measured, the load may be remarkably reduced. Therefore, the system and programs may be optimized for high performance and low power consumption.

The above-disclosed subject matter is to be considered illustrative and not restrictive, and the appended claims are intended to cover all such modifications, enhancements, and other embodiments, which fall within the true spirit and scope of the inventive concept. Thus, to the maximum extent allowed by law, the scope of the inventive concept is to be determined by the broadest permissible interpretation of the following claims and their equivalents, and shall not be restricted or limited by the foregoing detailed description.

What is claimed is:

1. A method for measuring power of a graphics processing unit in an embedded device including a central processing unit, the method comprising:
    changing a utilization of the graphics processing unit through an application programming interface (API) being executed on the central processing unit;
    measuring and storing the utilization and a driving frequency of the graphics processing unit for each trace time;
    measuring and storing power consumption of the graphics processing unit for each trace time;
    synchronizing the utilization of the graphics processing unit with the power consumption according to a stored trace time, and calculating a power coefficient for each driving frequency with reference to synchronized information; and
    estimating a real-time power consumption of the graphics processing unit (GPU) using the power coefficient corresponding to a real-time driving frequency, a real-time utilization, and a static power.

2. The method of claim 1, wherein the changing of the utilization of the graphics processing unit through the API comprises changing a size of data to be processed by the graphics processing unit and a sleep time of the graphics processing unit.

3. The method of claim 2, wherein the API for controlling the graphics processing unit comprises an open computing language (OpenCL) or an open graphics library (OpenGL).

4. The method of claim 3, wherein the utilization of the graphics processing unit is controlled by a first application program coded by the OpenCL or the OpenGL.

5. The method of claim 1, wherein at least one application program comprising a kernel module program for measuring the utilization, the driving frequency, and the power consumption of the graphics processing unit through a graphics processing unit driver is used.

6. The method of claim 1, wherein the graphics processing unit is included in a heterogeneous multi-core system, wherein the heterogeneous multi-core system drives a compiler that supports an OpenCL or an OpenGL.

7. The method of claim 1, wherein the calculating of the power coefficient for each driving frequency comprises applying linear regression analysis to the synchronized information to extract the power coefficient for each frequency.

8. The method of claim 7, further comprising storing the extracted power coefficient for each frequency.

9. The method of claim 1, further comprising:
reading the utilization and the driving frequency of the graphics processing unit; and
calculating the power consumption of the graphics processing unit at a current time with reference to the power coefficient.

10. The method of claim 9, wherein the power consumption is estimated as a value obtained by multiplying the power coefficient corresponding to the driving frequency by the utilization and adding a value of fixed power to a result of the multiplying.

11. The method of claim 9, wherein the utilization and the driving frequency of the graphics processing unit are measured using a hardware monitor provided to the graphics processing unit or a program monitor implemented by an OpenCL or an OpenGL.

12. The method of claim 1, wherein the graphics processing unit is included in a device for supplying Web of Things WoT service.

13. A method of estimating a real-time power consumption of a graphics processing unit GPU in an embedded device for supplying web of thing WoT service, the method comprising:
generating a power coefficient for each driving frequency through a linear regression analysis on an utilization, a driving frequency, and a power consumption of the graphics processing unit GPU through an application programming interface (API) being executed on a central processing unit;
measuring a real-time utilization and a real-time driving frequency of the graphics processing unit GPU; and
estimating the real-time power consumption of the graphics processing unit GPU using the power coefficient corresponding to the real-time driving frequency, the real-time utilization, and a static power.

* * * * *